United States Patent Office 3,492,073
Patented Jan. 27, 1970

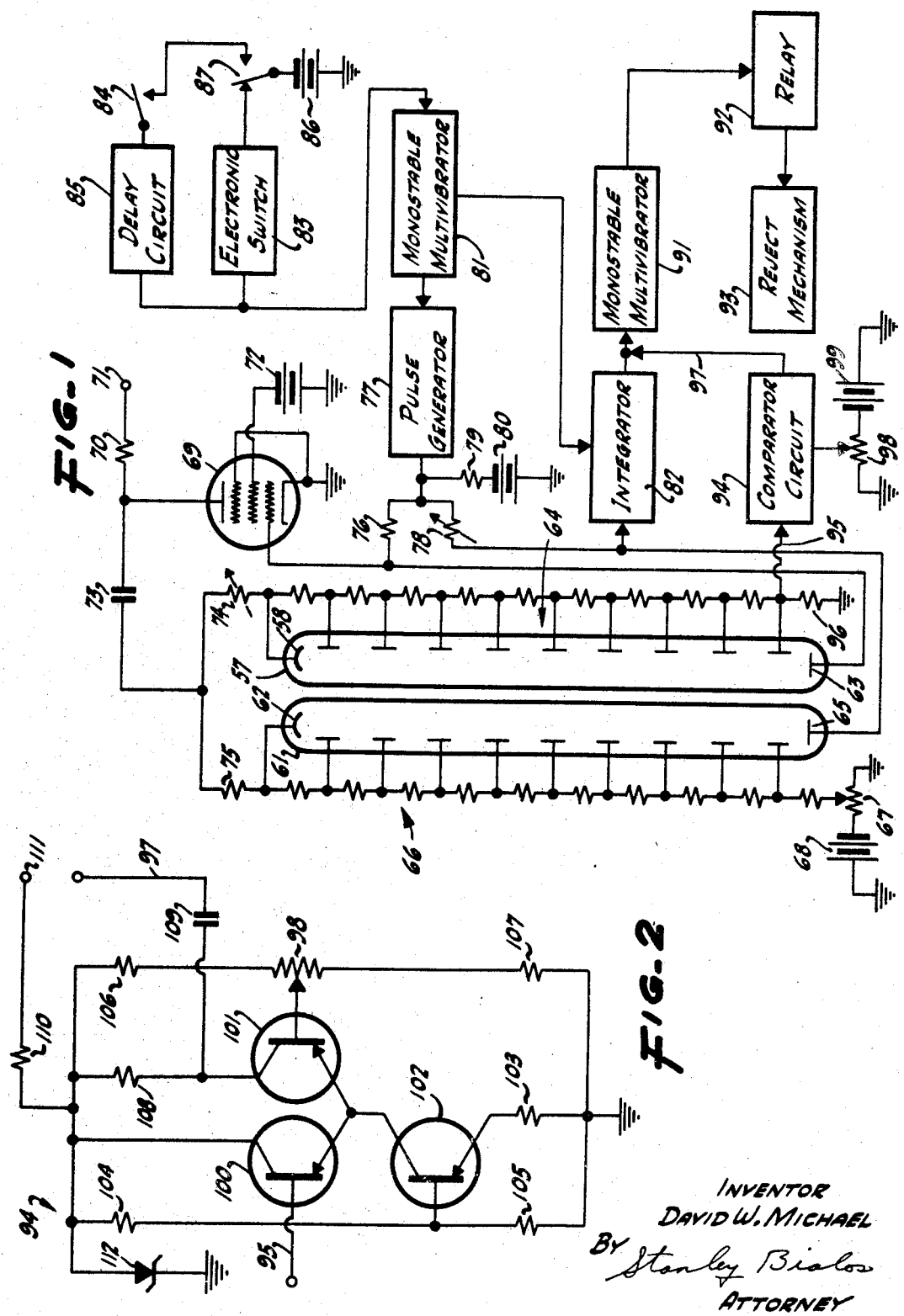

3,492,073
EGG BLOOD DETECTOR INCLUDING MEANS TO DETERMINE IF THE EGG IS TOO DENSE TO ACCURATELY CANDLE
David W. Michael, Berkeley, Calif., assignor to Food Systems, Inc., Berkeley, Calif., a corporation of California
Filed Dec. 1, 1966, Ser. No. 598,465
Int. Cl. G01n 33/08; A01k 43/00
U.S. Cl. 356—53                     10 Claims This invention relates to apparatus for determining the presence in a mixture of a substance having a concentration in excess of a predetermined level and, more particularly, to apparatus for determining the presence of blood in an unbroken egg.

As explained in Patent No. 3,255,660 to Edwin R. Hirt, eggs are graded in accordance with size and quality and sometimes in accordance with the color of the shell. Egg classification in accordance with size is usually carried out in automatic apparatus operative to separate the eggs by weight; and where color classification is desired, it usually constitutes a manual operation effected readily by direct visual inspection of the egg. Quality classification is more difficult, however, in that it requires inspection of the fluid contents within the unbroken shell of the egg and, to a great extent, such quality classification resides in determining the presence or absence of blood within such fluid contents and, specifically, the amount or concentration of the blood if any is present.

Traditionally such quality classification has been a manual operation, referred to as candling, in which an egg is held to a light and visually inspected in an effort to locate blood spots within the egg interior. Such manual technique is relatively slow and it is also quite unreliable not only because of variation in human judgment, but also because it is exceedingly difficult to visually detect the presence in an egg of blood which is diffused throughout the fluid contents thereof, but which is sufficient in quantity to lower the grading classification of the egg. As a matter of interest, when eggs are quite fresh, any blood present in the fluid contents thereof is generally diffused therethrough.

The aforementioned Patent No. 3,255,660 discloses an automatic apparatus for rapidly inspecting eggs to determine the presence therein of blood in excess of a predetermined quantity, and to segregate such lower-quality blood-containing eggs from those of higher quality. In general terms, such apparatus transmits through each egg radiant energy in the visual spectrum and having at least one wave length (e.g., 575 millimicrons) which is readily absorbed by any blood present in an egg. The radiant energy or light passing through such egg is made incident on a light-sensitive device, such as a photoelectric cell, responsive to the amount of light received thereby. Since the radiant energy includes a wave length sensitive to the presence of blood in an egg and absorbed thereby, it is evident that less radiant energy will be incident on the photosensitive device when the egg being inspected contains energy-absorbing blood than when blood is absent. Thus, a measure of the amount of energy transmitted through each egg can provide an indication of the presence or absence of blood therein.

However, and as discussed in such issued patent, the optical density of eggs varies considerably, particularly as the egg shell changes in thickness and in color from white to off-white and through the various shades of brown, and because of this variation in optical density which significantly changes the amount of radiant energy passed to the photosensitive device by various eggs, it is not feasible to establish a fixed objective reference against which the quantity of radiant energy transmitted through each egg can be compared to determine whether blood is present in the egg. Accordingly, the apparatus disclosed in such issued patent provides a variable or contemporaneously-established reference derived from the optical density of the particular egg under test and against which the radiant energy transmitted therethrough can be compared to determine the presence or absence of blood.

The feasibility of such variable or contemporaneously-established reference standard is derived from the fact that radiant energy at certain wave lengths within the visual or optical spectrum is not appreciably absorbed by blood in an egg and, therefore, the amounts of energy at such wave lengths that would be transmitted through two eggs identical in all respects except that one such egg contains blood, are substantially equal. Consequently, and as disclosed in such patent, an egg-inspecting apparatus can be made to operate successfully in which radiant energy at two different wave lengths (one of which is absorbed by blood in an egg and the other of which is substantially unaffected by the presence of blood) is transmitted through an egg, and the amounts of energy at the two selected wave lengths then compared to determine whether blood in excess of a predetermined concentration is present in the egg as evidenced by less energy being transmitted therethrough at the blood sensitive wave length. By way of example, it has been determined that a wave length in the approximate order of 600 millimicrons is not appreciably absorbed by blood, and two specific frequencies which can be employed successfully are 575 millimicrons for the blood-sensitive band and 597 millimicrons for the side or reference band.

Although the blood detector apparatus disclosed in the aforementioned Patent No. 3,255,660 has operated quite successfully in a great variety of commercial environments to detect the presence in an egg of blood in excess of a predetermined level, occasionally an egg will be encountered which is quite dense in an optical sense and the amount of light transmitted therethrough is insufficient to energize the electrical circuitry of the apparatus, in which event the optically dense egg (often referred to as a "dark" egg) passes through the detector apparatus successfully. If such optically dense eggs were free of blood, passage thereof through the apparatus would not be an undesirable occurrence. However, a dark or optically dense egg is quite often one which contains an excessive quantity of blood so that its passage through the apparatus is an error.

Accordingly, an object, among others, of the present inveniton is to provide an improved detector apparatus of the type disclosed in the aforementioned patent, and which improved apparatus is responsive to the presence of an optically dense or dark egg so as to reject the same as a blood-containing egg. Additional objects and advantages of the invention will become apparent as the specification develops.

An embodiment of the invention is illustrated in the accompanying drawing in which:

FIGURE 1 is a schematic circuit diagram of the electric circuitry of the detector apparatus; and FIGURE 2 is a schematic circuit diagram of the comparator component or module of the apparatus.

As stated heretofore, the present invention constitutes an improvement of the detector apparatus disclosed in Patent No. 3,255,660, and in a structural sense resides in an addition to the circuitry of such apparatus as illustrated in FIGURE 8 of such patent. In general terms, such addition comprises a comparator circuit operative to compare the amount of energy transmitted through each egg with an objective reference standard, and to cause the egg to be rejected whenever the amount of energy transmitted therethrough is less than that required by such reference standard. In order to facilitate an understanding of the details of such comparator circuit, it is illustrated in FIGURE 1 in association with the general circuitry of the egg blood detector disclosed in the aforementioned patent, and a description of such circuitry will be set forth herein both as a matter of convenience and to facilitate an understanding of the functions of the comparator circuit.

First, however, it may be noted that the detector apparatus in terms of the optical components (not shown) thereof includes a light source, which can be an ordinary incandescent lamp, mounted within a housing having an exit aperture through which light is directed outwardly through a collimating lens. The light transmitted through the exit aperture is directed toward an egg positioned at a test position in the light path, and the light is reflected and refracted about the inside of such egg, is absorbed in part by the various light-absorbing pigments thereof, and is transmitted in part through the egg. That portion of the light successfully transmitted through the egg is focused by a collimating lens into a beam of substantially parallel rays directed to a beam splitter which may be a typical half-silvered mirror.

The beam splitter divides the collimated light into two separate beams one of which continues through the beam splitter and through a band-pass filter and focusing lens toward a photosensitive device such as the multiplier phototube 57 shown in FIGURE 1 so as to be incident upon the photosensitive cathode 58 thereof. The other beam is reflected at right angles by the beam splitter through a band-pass filter and focusing lens toward a photosensitive device such as the multiplier phototube 61 so as to be incident upon the photosensitive cathode 62 thereof. The light source provides a band of radiant energy sufficiently wide to include both blood-sensitive and blood-insensitive wave lengths which, in accordance with the prior example, would constitute 575 millimicrons and 597 millimicrons, respectively. The band-pass filters (not shown) may be interference type optical filters having a narrow band pass so as to permit the transmission therethrough only of radiant energy within the preselected pass bands which again would be 575 millimicrons and 597 millimicrons in accordance with the prior example.

Although various photosensitive devices may be used in the apparatus (solid state phototransducers, for example), the multiplier phototubes 57 and 61 illustrated in FIGURE 1 are advantageously used in the present apparatus because the minute current generated by the low intensity light impinging on the photocathode of each tube is amplified by the action of a series of dynodes or secondary emission stages contained within the tube itself thereby obviating the necessity of separate amplification stages that might otherwise be required. In the operation of such multiplier phototube, light incident on the photocathode thereof causes the release of electrons which are attracted to the first of the series of dynodes. The electrons arriving at the first dynode cause the release of secondary electrons that are rejected from the dynode surface at a relatively low velocity and are accelerated toward the second dynode. This operation is repeated from dynode to dynode so that there are a very great number of electrons finally arriving at the anode of the tube.

The multiplier phototube 57, in addition to having a photosensitive cathode 58, is provided with an anode 63 and a plurality of dynodes interposed therebetween—there being nine in number in the specific tube illustrated. The dynodes of the tube 57 are connected in the usual manner to the several taps of a resistance-type voltage divider generally indicated by the numeral 64—one end of which is connected to the cathode 58, and the other end of which is connected to a point of fixed potential, or specifically ground. In a similar manner, the multiplier phototube 61 has an anode 65 and a plurality of dynodes—there being nine in number. The dynodes of this tube are connected to the several taps of a resistance-type voltage divider generally indicated by the numeral 66—one end of which is connected to the photocathode 62, and the other end of which is connected to the adjustable tap of a potentiometer 67 connected between ground and a negative voltage supply 68.

An electron discharge device in the form of a pentode vacuum tube 69 is included in the circuit, and has a grounded cathode and its anode connected through a resistance 70 to a high voltage DC power supply indicated in general by the terminal 71. The suppressor grid of the tube 69 may be grounded, as illustrated, and a positive voltage is applied to the screen grid from an appropriate voltage supply 72. A capacitance 73 having one of its terminals connected to the anode of the tube 69, has the other terminal thereof connected to the junction of a pair of resistances 74 and 75—the first of which is variable and has the opposite side thereof connected to the voltage divider 64 or, more particularly, to the cathode 58 of the multiplier phototube 57. The resistance 75 is fixed, and its opposite side is connected to the voltage divider 56 and in particular to the photosensitive cathode 62 of the tube 61.

The control grid of the tube 69 is directly connected to the anode of the phototube 57, and the anode is connected through a resistance 76 to the output terminal of a pulse generator 77. The output terminal of the pulse generator is also connected through a variable resistance 78 to the anode of the phototube 61. The output terminal of the pulse generator 77 is further connected through a resistance 79 to a power supply 80 providing a negative potential at the junction of the resistances 76 and 78 (the control grid of the tube 69 is connected to such junction through the resistance 76). The biasing potential applied to the tube 69 normally maintains the same in a cut-off condition.

The pulse generator 77 is operable to produce a positive-going voltage pulse at its output terminal of sufficient value to cause the tube 69 to conduct; and the generator is cyclically conditioned to produce such positive-going pulse. The operation thereof is controlled through a switching circuit which may include a monostable multivibrator 81 having output connections to the pulse generator 77 and to the reset terminal of an integrator 82. Such switching circuit selectively includes one or the other of an electronic switch 83 or a mechanical switch 84 and delay circuit 85 in series therewith, selectively connected to an appropriate power supply 86 through a switch 87 which may be manually operated.

The switch 84 is a mechanical means for connecting the power supply 86 to the multivibrator 81, and will be associated with the conveyor mechanism that advances the eggs into the detector apparatus. The switch 84 will be closed just prior to an egg reaching the inspection position, and the closing of the switch provides an electric pulse, which is delayed by an adjustable amount in the delay circuit 85, so that the multivibrator 81 is triggered just as the egg reaches precisely the desired inspection position. The delay circuit 85 may be any of various well known adjustable delay circuits, such as a resistance-capacitance network or a monostable multivibrator provided with adjustments in its timing network, and in certain instances a mechanical delay device may be advantageously employed. If the manually adjustable selector switch 87 is in a position such that the electronic switch 83 is connected to the power supply 86, the multivibrator 81 will be triggered by a pulse therefrom.

The multivibrator 81 produces a pulse of fixed but short duration; and in the particular apparatus illustrated, the time of such pulse is approximately five milliseconds. During such five-millisecond period, each of the multiplier phototubes 57 and 61 is energized and an egg in the inspection position shown in FIGURE 1 is tested for the presence of blood therein. At all other times, the multiplier phototubes are deenergized—whereby the detection circuit is effectively "on" during only the brief intervals that an egg is precisely positioned at the inspection station, and is "off" during the much longer intervals between such positioning of successive eggs. Such pulsed operation of the circuit significantly minimizes fatigue of the multiplier phototubes, and thereby provides stable and reliable operation over extended periods of use without recalibration. The stated period of five milliseconds is not critical, and it may be increased or decreased somewhat depending upon the speed of any associated egg-handling equipment.

Each five-millisecond pulse generated by the multivibrator 81 energizes the pulse generator 77 for a like period, with the result that the generator 77 provides at its output terminal a pulse of accurately controlled duration (e.g., five milliseconds) and of accurately controlled positive amplitude sufficient to cause the tube 69 to conduct. The generator 77 may be of any conventional type such as those used for generating pedestal pulses in television circuits, and depending upon particular installations, it may produce a plurality of different pulses for controlling various other components. When the output terminal of the generator 77 becomes positive, the tube 69 conducts current and, necessarily, the voltage drop thereacross suddenly decreases in value. Thereupon, the capacitance 73 commences to discharge through the resistances 74 and 75 and through the voltage dividers 64 and 66, with the result that the voltage thereby caused to appear across the phototubes 57 and 61 effects current conduction thereof.

Responsive to the voltages then present across the phototubes and to the light incident upon the photocathodes thereof, the phototube 57 begins to conduct current and the resultant anode current thereof flows through the resistance 76 producing a voltage drop thereacross in a direction that decreases the voltage applied to the control grid of the tube 69. This change in the control grid potential results in a decrease in the current conducted by the tube 69, thereby tending to counteract the drop in voltage at the anode thereof (i.e., the voltage drop across the tube increases). This negative feedback action regulates the anode currents of the multiplier phototubes 57 and 61 in that the magnitude of the voltage difference applied between the respective cathodes and anodes thereof depends upon the charge on the capacitance 73, which in turn is dependent upon the amount of anode current of the tube 69 and anode potential resulting therefrom. Thus, the anode currents of the multiplier phototubes 57 and 61 are controlled by this regulatory action so as to be substantially constant irrespective of variations over a wide range in the intensity of the light incident on the photocathodes 58 and 62 thereof.

In use of the circuitry, the resistance 78 is adjusted so that the voltage drop thereacross slightly exceeds the voltage drop across the resistance 76 when the egg tested is bloodless. Therefore, the anode of the phototube 57 is prevented from assuming a substantially positive potential by the negative feedback regulation heretofore described. The anode of the phototube 61 will not assume a substantially positive potential so long as the eggs under test are bloodless.

However, when an egg containing a predetermined quantity of blood is inspected, the amount of light incident on the cathode of the phototube 61 is reduced somewhat relative to the amount of light incident on the cathode of the phototube 57; and as a consequence, the phototube 61 conducts less current and the voltage drop across the resistance 78 is smaller than normal. As a result, the anode of the phototube 61 becomes more positive to an extent dependent upon the amount of blood present in the egg and is, then, an indication of the presence of blood therein. The resistances 76 and 78 may both be fixed, but greater flexibility and circuit adjustment are afforded by making the resistance 78 variable as, for example, in adjusting for small differences in phototube sensitivities, differences in transmission efficiencies of the several parts of the optical system, and other inequalities.

As explained heretofore, positive-going voltages at the anode of the phototube 61 indicate the presence of blood in an egg being inspected. However, it is not desirable to depend solely upon momentary voltage spikes as some statistical fluctuation and "noise" in the various circuit voltages are to be expected. Hence, the preferable practice is to integrate or average the voltage at the anode of the phototube 61 over the interval that an egg is being inspected (the exemplary five milliseconds). For this purpose, the anode of the phototube 61 is connected to the input terminal of the integrator 82 which may be any of various well known electronic integrating circuits—for example, a vacuum tube or transistor controlling the rate of charging or discharging of a capacitance.

If the integrated voltage over such time period exceeds a preset value determined by the circuit design, the output terminal of the integrater attains a sufficient voltage to trigger a monostable multivibrator 91 which thereupon energizes a relay 92 controlling a reject mechanism 93. Between integrating periods, the integrator 82 is reset (e.g., its capacitance is recharged) as by means of a signal supplied to its reset terminal from the multivibrator 81. The reject mechanism 93 is arranged along the path of travel of the eggs being advanced through the detector apparatus and functions to displace from such path those eggs having a sufficient quantity of blood to energize the circuit, as described, and thereby cause the relay 92 to actuate the reject mechanism.

The described negative feedback control over the anode currents of the mupltiplier phototubes 57 and 61 maintains such anode currents relatively constant irrespective of the amount of light incident on the photocathodes thereof (within limits—the comparator circuitry considered hereinafter being operative in response to diminution of the light beyond a lower limit). Therefore, for any egg being inspected and whether of high or low density, the anode currents for the respective multiplier phototubes are substantially the same in either case even though the amount of light reaching the photosensitive cathodes is much greater for the low density egg than for the high density egg.

The resistances 74 and 75 define a predetermined ratio between the voltages applied across the phototubes 57 and 61. More particularly in this respect, the vacuum tube 69 is arranged with the multiplier phototubes 57 and 61 such that when the tube 69 is cut off, the impedance thereof becomes infinitely high and the voltage drop across the circuit constituted of the multiplier phototubes 57 and 61 and vacuum tube 69 appears almost entirely across the vacuum tube. The applied voltage, by way of example, usually is in the range of about 1,200 to 1,500 volts. Evidently, the capacitance 73 is charged to approximately the same voltage value, and when the tube 69 begins to conduct, the capacitance 73 begins to discharge. The current path for such discharge is to ground through the resistances 74 and 75 and primarily through the respectively associated voltage divider networks 64 and 66 (a small portion of the current flow is through the phototubes 57 and 61).

During such discharge of the capacitance 73, a voltage drop occurs across the resistances 74 and 75 so that the net voltage across the phototube 57 necessarily excludes the amount of the voltage drop across the resistance 74. Similarly, the net voltage across the tube 61 excludes the amount of the voltage drop across the resistance 75. In that the current amplification of a multiplier phototube is dependent upon the magnitude of the potential difference between the respectively successive elements thereof, the higher the value of resistance 74, for example, for any given current flow, the lower will be the amplification of the multiplier phototube 57 and the anode current thereof. The same relationship exists as to the resistance 75 and its associated photomultiplier 61. Consequently, the values of the resistances 74 and 75 may be determined to provide the desired ratios of gains or amplification between the two phototubes 57 and 61. The resistance 74 is made variable so as to permit accurate tailoring of the circuit and it also affords a ready means for compensating the circuit for different basic phototube gains.

The resistance 78 is made variable to weight or compensate the circuit for various differences such as those exhibited by the optical system and which collectively affect the degree of light transmission in each of the channels (i.e., the blood band and reference band channels). In this respect, the aforementioned optical filters (not shown) have some band width differences, and the dichroic or beam splitting mirrors used in the optical system do not have identical intensity ratios in the two transmission directions thereof. Further, the sensitivities of the photocathodes of the multiplier phototubes may differ. All such differences can be accommodated and the circuit weighted to obtain the desired ratio of performance between the two channels by proper adjustment of the resistance 78. Adjustment of the potentiometer 67 permits the precise voltages appearing on the various elements of the multiplier phototube 61 to be adjusted as necessary to provide the desired amplification relationship between the two channels. The circuitry so far described is explained in greater detail in the aforementioned Patent No. 3,255,660, and reference may be made thereto for a further consideration of such details.

The comparator circuit of the present invention is denoted in FIGURE 1 with the numeral 94 and has a first or main input signal line 95 connected to one side of the terminal resistance 96 in the aforementioned voltage divider 64. Accordingly, the signal present on the input signal line 95 constitutes the potential at the point of connection of the signal line to the resistance 96, which potential is determined by the current flowing through the resistance 96 at any particular instant. The output signal from the comparator circuit 94 is delivered via a signal line 97 to the the input terminal of the monostable multivibrator 91. The signal appearing from time to time on the input line 95 is the test or comparison signal which is compared in the circuit 94 to a reference signal derived from a potentiometer 98 which is shown exteriorly of the circuit block 94 in FIGURE 1 to emphasize that the comparator circuit can be selectively adjusted to alter the value of the reference signal. However, for any setting of the potentiometer 98, the reference signal has a fixed value defining a predetermined objective reference standard. A constant potential is provided across the potentiometer 98 by a power source 99 which, in the form shown, is a battery. The positive terminal of the battery is grounded, and the potentiometer is connected in series between the negative terminal of the battery 99 and ground.

The comparison signal developed across the resistance 96 is proportional to the optical density of the egg being inspected, and is delivered via the input signal line 95 to the base element of a transistor 100, as shown in FIGURE 2. The transistor 100 is connected in a parallel-type arrangement with a second transistor 101, and the input signal to such transistor 101 constitutes the reference signal which, as indicated heretofore, is a DC biasing voltage derived from the adjustable tap of the potentiometer 98 and delivered to the base of the transistor 101. The transistors 100 and 101 are arranged in the circuit associated therewith so that when the input signal delivered to the transistor 100 via the signal line 95 has a value exceeding the value of the DC signal delivered to the base of the transistor 101, the comparator circuit 94 generates an output pulse on the signal line 97, thereby causing the monostable multivibrator 91 to which it is delivered to energize the relay 92 and actuate the reject mechanism 93. So long as the voltage applied to the base of the transistor 101 exceeds the value of the input signal appearing on the line 95, no output pulse will be generated by the circuit to energize the multivibrator 91.

As seen in FIGURE 2, the emitter elements of the transistors 100 and 101 are connected in common to the collector element of a transistor 102 which functions as a DC amplifier to provide a relatively constant current flow through one or the other of the transistors 100 and 101. In this respect, the transistor 102 is connected in series between ground and the emitter element of the transistors 100 and 101. Emitter bias for the transistor 102 is provided by a resistance 103, and base bias is established by a voltage divider consisting of series connected resistances 104 and 105.

The potentiometer 98 is connected between and in series with resistances 106 and 107, and defines a voltage divider therewith. A load resistance 108 is connected in the collector circuit of the transistor 101, and the output signal line 97 is connected to the juncture of the resistance 108 and collector element of the transistor 101 through a coupling capacitance 109 which differentiates the signal pulses appearing on the collector of the transistor 101. A voltage dropping resistance 110 is connected in series with the applied voltage which is delivered to a terminal 111, and the value of such applied voltage may be approximately 24 volts in a particular circuit, the component values of which will be noted hereinafter. A voltage regulator 112 in the form of a Zener diode is connected between ground and the juncture of the resistance 104, 106 and 108 with the voltage dropping resistance 110, and such voltage regulator maintains a substantially constant voltage between such juncture and ground (i.e., across the circuit).

In operation of the comparator circuit 94, the potentiometer 98 is adjusted to provide a DC voltage on the base of the transistor 101 of sufficient value to define the objective reference standard against which signals appearing on the input signal line 95 are compared. Whenever the signal voltage appearing on the line 95 is more negative than the voltage appearing on the base of the transistor 101, the transistor 100 conducts thereby causing the emitter potential thereof (and emitter potential of the transistor 101) to become more negative with respect to the reference voltage appearing on the base of the transistor 101. As a consequence thereof, the transistor 101 becomes reverse biased and is incapable of conducting current. Upon such occurrence, the collector element of the transistor 101 becomes more negative, whereupon a negative going pulse appears on the output signal line 97 to trigger the multivibrator 91. So long as the transient signal voltage appearing on the line 95 is more positive than the reference voltage appearing on the base of the transistor 101, such transistor remains conductive and no negative going output pulse appears on the signal line 97.

Evidently, the applied voltage delivered to the terminal 111 together with the voltage divider network defined by the resistances 110, 106 and 107 are the equivalent of the battery 99 illustrated in FIGURE 1, and in this respect the DC reference voltage appearing on the movable contact of the potentiometer 98 is determined by the position thereof and by the value of the voltage developed across the potentiometer.

Generally stated, the amount of light incident upon the photosensitive cathodes 58 and 62 of the multiplier phototubes 57 and 61 is determined by the optical density (i.e., degree of opacity) of the egg being inspected at any particular instant. Clearly this is the case because the more opaque or optically dense the egg under test, the less light will be transmitted therethrough. The multiplier phototube 57 from which the test signal appearing on the line 95 is obtained is associated with the side band or reference band of the apparatus and the amount of light incident on the photosensitive cathode 58 of such tube is substantially unaffected by the presence or absence of blood in an egg being inspected. However, the amount of light received by the cathode 58 will vary in accordance with the opacity or optical density of each egg being inspected, and in this respect, as the thickness of an egg shell increases or as the color of the shell becomes darker, the amount of light transmitted therethrough is decreased and less light energy will be incident on the cathode of the phototube 57.

As explained heretofore, because of the characteristics of a multiplier phototube, the dynode current thereof will decrease along with a decrease in the quantity of light received by the cathode of the tube. Accordingly, when an egg being inspected is quite dense optically, the dynode current flow will be small and the flow of current through the voltage divider network 64 will decrease. Consequently, the voltage drop across the resistance 96 will diminish and the resulting negative going signal appearing at the base of the transistor 100 causes it to conduct, wherefore, the potential on the emitter elements of the transistors 100 and 101 becomes more negative and the normally conducting transistor 101 becomes cut off. A negative going pulse then appears on the signal line 97 and causes the multivibrator 91 to energize the relay 92 which actuates the reject mechanism 93 and segregate the egg under inspection as being a blood-containing egg. Since experience has shown that eggs which are quite opaque or optically dense usually contain blood in excess of a predetermined quantity, such eggs are properly rejected by the apparatus. Thus, the comparator circuitry in association with the egg blood detector is effective to increase the accuracy and reliability of the apparatus by causing it to reject blood-containing optically-dense eggs which otherwise would be erroneously passed.

For purposes of presenting a specific example of component values in a typical illustrative circuit, the following may be consider:

| | | |
|---|---|---|
| Resistance 96 | ohms | 3.9K |
| Potentiometer 98 | do | 2.5K |
| Transistor 100 | | 2N404A |
| Transistor 101 | | 2N404A |
| Transistor 102 | | 2N404A |
| Resistance 103 | ohms | 680 |
| Resistance 104 | do | 15K |
| Resistance 105 | do | 2.2K |
| Resistance 106 | do | 1.5K |
| Resistance 107 | do | 680 |
| Resistance 108 | do | 5.6K |
| Capacitance 109 | microfarads | 0.0022 |
| Resistance 110 | ohms | 2.7K |

It should be appreciated that the specific circuit values set forth imply no criticality and can be varied greatly depending upon internal and external parameters, the choice of transistors, the particular environment setting, etc.

The multiplier phototubes 57 and 61 are evidently photosensitive devices each operative to produce an output dependent upon the magnitude of the light energy incident thereon. In an even more general sense, such photosensitive multiplier phototubes are sensing devices responsive to the receipt of radiant energy and effective to produce a sensible output corresponding to the magnitude thereof. The entire circuit complex energized by the outputs of the multiplier phototubes whenever the blood level in an egg exceeds a predetermined value may be taken to be a signal generating network ecective to actuate the egg rejecting mechanism. In a more particular sense the signal generating network is energized by signals derived from the output currents of the multiplier phototubes and, in the case of the comparator circuitry, the test or comparison signal which is compared with the fixed reference signal is derived from the dynode current of the multiplier phototube 57.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In apparatus for determining the presence in a mixture of a substance having a concentration in excess of a predetermined level, such mixture being adapted to pass therethrough energy of a first wave length which is attenuated by the presence of said substance and of a second wave length the intensity of which is substantially unaffected by the presence of such substance in the mixture and which mixture in any particular sampling thereof may permit an amount of energy to pass therethrough making determination by the apparatus as to the presence or absence of an excessive level of the substance in such particular sampling unreliable, a pair of sensing devices arranged to receive energy at such first and second wave lengths after transmission thereof through such mixture and received, circuit means including said sensing devices and comprising a signal generating network operative to generate a signal when the output of said sensing device receiving said first wave lengths exceeds a predetermined level and thereby represents the presence in any sampling of the mixture of such substance in a concentration thereof exceeding such predetermined level, and comparator circuitry connected with said sensing device receiving said second wavelength for comparing the output thereof with a predetermined reference and for energizing said signal generating network whenever such a particular sampling of the mixture passes energy therethrough in an amount making determination of the presence or absence of an excessive level of the substances in such sampling unreliable.

2. The apparatus according to claim 1 in which the energy passed through said mixture is light energy and in which each of said sensing devices is a photoresponsive device, and in which said comparator circuitry includes means for comparing two input signals thereto one of which is derived from the output of the photoresponsive device with which said comparator circuitry is connected and the other of which is a reference signal of predetermined value, said means being operative to produce an output signal whenever the input signal thereto derived from the associated photoresponsive device exceeds the reference signal.

3. The apparatus according to claim 2 in which said comparator circuitry means includes a pair of transistors one of which receives and is controlled by the input signal derived from the photoresponsive device with which said comparator circuitry is connected and the other of which receives the reference signal.

4. The apparatus according to claim 3 for the candling of eggs in which said comparator circuitry includes circuit components which normally maintain the aforesaid one transistor in an inoperative condition and the said other transistor in a conductive condition, the normal conditions of such transistors being reversed whenever the value of the input signal delivered to said one transistor exceeds the value of the reference signals, said comparator circuitry means being operative to produce an output signal effective to cause energization of said signal generating network whenever such normal condition of said transistors is reversed.

5. The apparatus according to claim 2 in which said comparator circuitry is connected with the photoresponsive device arranged to receive the wave length which is substantially unaffected by the presence of such substance in the mixture.

6. The apparatus according to claim 1 in which the energy passed through such mixture is light energy, and in which each of the sensing devices is a multiplier phototube having an anode element, cathode element and plurality of dynode elements, and in which said circuit means is connected with said multiplier phototubes to apply voltages thereacross and between the respectively successive elements thereof to enable the tube to conduct in response to light energy incident on the cathode elements thereof.

7. The apparatus according to claim 6 in which said comparator circuitry includes means comprising a pair of transistors for comparing two input signals, one such input signal being derived from the output of the multiplier phototube with which said comparator circuitry is connected and being received by one of said transistors to control the same, the other such input signal being a reference signal of predetermined value and being received by the other of said transistors, said comparator circuit means being operative to produce an output signal whenever the input signal thereto derived from the associated multiplier phototube exceeds the reference signal.

8. The apparatus according to claim 7 in which said comparator circuitry includes circuit components which normally maintain the aforesaid one transistor in an inoperative condition and the said other transistor in a conductive condition, the normal conditions of such transistors being reversed whenever the value of the input signal delivered to said one transistor exceeds the value of the reference signal, said comparator circuitry means being operative to produce an output signal effective to cause energization of said signal generating network whenever such normal condition of said transistors is reversed.

9. The apparatus according to claim 8 in which said comparator circuitry is connected with the multiplier phototube arranged to receive the wave length which is substantially unaffected by the presence of such substance in the mixture.

10. The apparatus according to claim 9 in which said multiplier phototubes develop curent outputs in response to the receipt of light energy thereby, the aforesaid differences to which said signal generating network is responsive being derived from such current outputs.

References Cited

UNITED STATES PATENTS 3,255,660  6/1966  Hirt.

JEWELL H. PEDERSEN, Primary Examiner

ORVILLE B. CHEW II, Assistant Examiner

U.S. Cl. X.R.

209—75, 111.6; 317—124, 130